H. HAHN.
PEELING MACHINE.
APPLICATION FILED DEC. 27, 1907.

910,374.

Patented Jan. 19, 1909.

WITNESSES:
Manuel P. Rodrigues
Manuel S. Bettencourt

INVENTOR.
Herman Hahn
BY Baldwin Vale
ATTORNEY.

THE NORRIS PETERS CO., WASHINGTON, D. C.

UNITED STATES PATENT OFFICE.

HERMAN HAHN, OF ALAMEDA, CALIFORNIA, ASSIGNOR OF ONE-THIRD TO MANUEL P. RODRIGUES AND ONE-THIRD TO MANUEL S. BETTENCOURT, BOTH OF SAN LEANDRO, CALIFORNIA.

PEELING-MACHINE.

No. 910,374.

Specification of Letters Patent.

Patented Jan. 19, 1909.

Application filed December 27, 1907. Serial No. 408,283.

*To all whom it may concern:*

Be it known that I, HERMAN HAHN, a citizen of the United States, and residing at 2237 San Antonia avenue, in the city of Alameda, county of Alameda, and State of California, have invented certain new and useful Improvements in Peeling-Machines; and I do hereby declare the following to be a full, clear, and exact description of the said invention, such as will enable others skilled in the art to which it most nearly appertains to make, use, and practice the same.

This invention relates to certain new and useful improvements in vegetable peeling machines.

The invention has for its object the production of a simple and inexpensive machine of this character constructed to remove the outer skins of vegetables, with minimum waste, and without injury to the edible portion thereof.

Broadly stated the invention comprises an inclosed drum the inner circumference of which is studded with a series of independent, spring actuated brushes; and a revolving cylinder within the drum having brushes fixed on its periphery and coöperating with the before mentioned brushes in such a manner that a potato, or like vegetable, fed between the two sets of brushes is caused to travel around within the drum, whereby only the outer skin, softened by a stream of water passing through the drum, is loosened and removed by the abrasive action of the brushes.

The invention will be hereinafter fully set forth and particularly pointed out in the claims.

Figure 1:
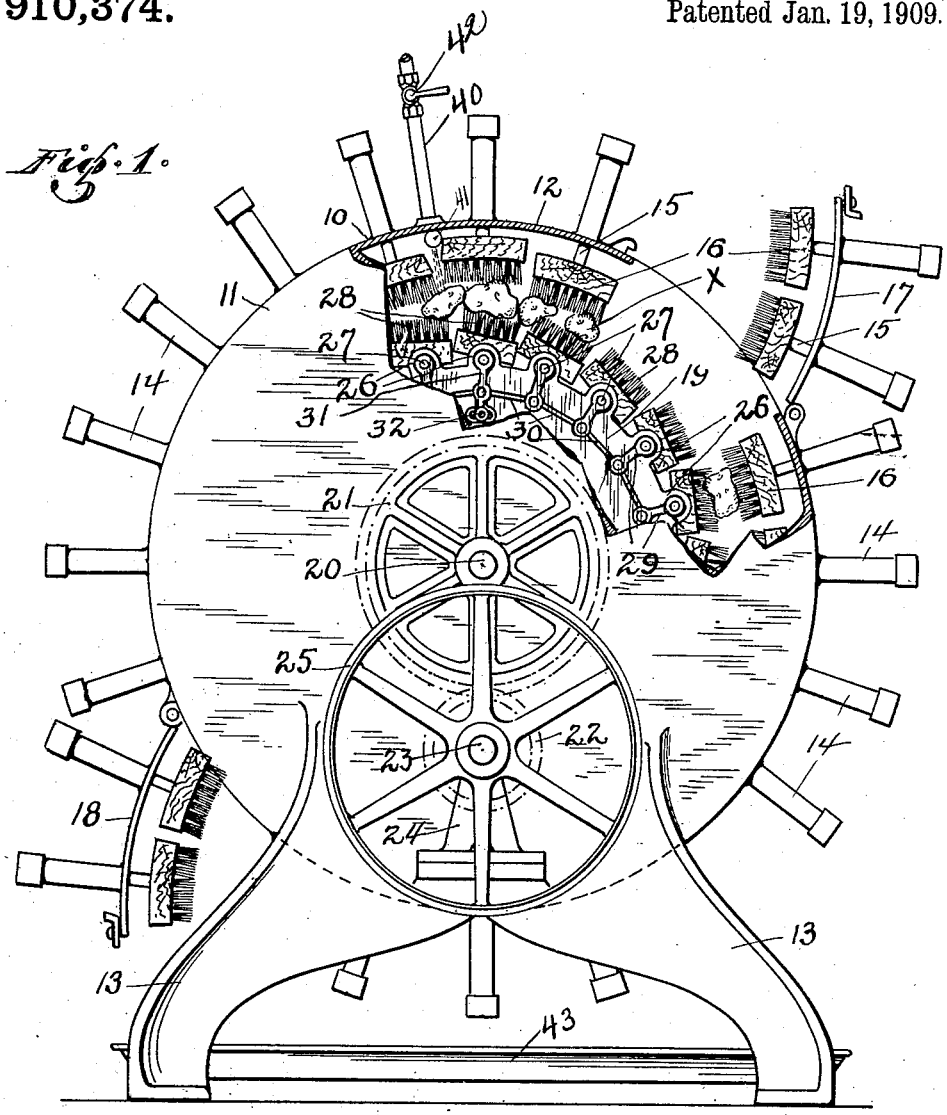
Figure 2:
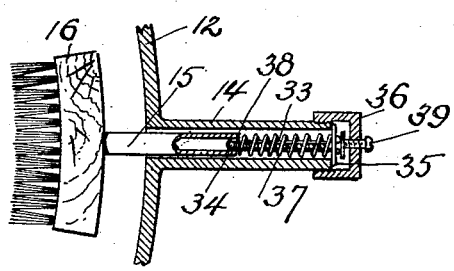

In the accompanying drawings—Figure 1 is a side elevation of a machine constructed in accordance with this invention, portions being broken away in cross section to disclose the construction and arrangement of underlying mechanisms. Fig. 2 is a detail in cross section of one of the resilient brushes mounted in the circumference of the drum.

In detail the construction comprises the inclosing drum which consists of the circumference 10, the sides 11 and 12, and supported by the legs 13. The circumference is studded with tubes 14 extending radially outward therefrom. These tubes inclose the stems 15, resiliently mounted therein and supporting the brushes 16. An upper and lower trap door 17 and 18 are hinged to the circumference, and respectively serve as entrance and exit for the reception and discharge of the objects to be treated.

The revolving drum 19 is fixed upon and revolves with the shaft 20 journaled in the sides of the drum and driven by the gear 21, enmeshed with the driving pinion 22, fixed on the driving shaft 23, journaled in the pillow block 24 and stepped in a socket in the side of the drum. The driving shaft is driven to the left by pulley 25 suitably belted to a source of power.

The periphery of the drum 19 is provided with suitable mountings 26 for the reception of the rods 27 upon which the brushes 28 are fixed. These brushes are preferably set on a plane tangential to the periphery of the drum, whereby the potatoes, or other objects, are caused to travel up the elevating side of the drum. Were the brushes not so set the objects would tend to accumulate at the bottom of the drum until forced round by those objects behind, thus placing an undue strain on the brushes and interfering with the uniform operation of the machine. To vary the plane of the brushes 28 the rods 27 are provided with the arms 29 linked together by the links 30, the major arm 31 being provided with the set screw 32 so that the plane of all of the brushes may be changed and locked in a fixed position to suit the contours, or physical properties of the objects to be treated. The side 12 is removable to permit access to or removal of the drum.

The stems 15 of the brushes 16 are held within the tubes 14 by the wire loops 33 (see Fig. 2) the bight of which engages the pin 34 through the end of the stem; the open end of the loop extends through, and the bent ends engage the edges of the holes in the washer 35 which engages the end of the tube 14 within the cap 36. The loop 33 is encircled by an expansive spring 37 expanding between the washers 35 and 38. The tension of the spring can be varied by the tension screw 39 threaded in the cap 36 and bearing against the washer 35. By this construction the tension of the brushes can be varied without disturbing the other adjustments of the machine. These brushes may be mounted otherwise however, with equal advantage;

therefore, I do not wish to be confined to this specific construction in interpreting this invention.

The machine is operated as follows:—The objects to be treated, potatoes for instance, are dumped into the drum through the open trap 17 which is then latched. The rotation of the drum carries them under the brushes 16 which recede sufficiently to permit them to pass, and at the same time exert sufficient pressure to cause the abrasion necessary to remove the outer skin which has been loosened by the water admitted to the drum through the inlet pipe 40 and the spray head 41. The irregular contour of the vegetable causes it to rotate and travel about between the brushes in such a manner that all of its surface is acted upon by the brushes which effectively remove the skin, the "eyes" and any soft or defective spots.

Practice has proven that about one complete revolution of a machine three feet in diameter and making forty revolutions per minute is sufficient to effectively peel a potato, or other similar tuber. All peelings, dirt and debris is washed from the machine by the stream of water (controlled by the valve 42) into the drain pan 43 from whence it can be removed in any suitable manner. When the operator deems the charge to have been sufficiently treated the trap 18 is unlatched and the drum allowed to rotate until all the potatoes peeled and clean are discharged into a waiting receptacle; the discharge trap is then closed and the operation repeated.

If desired the machine may be made of sufficient diameter to permit a continuous feed of potatoes. The machine is practical in any size from the large power driven machine to the smaller size operated by hand power for domestic use.

I claim as my invention:—

1. A peeling machine comprising an inclosed drum having brushes resiliently mounted about its inner circumference, and a revoluble cylinder within said drum having brushes pivotally mounted on the periphery thereof adjacent the first mentioned brushes, means for adjusting said brushes, inlet and outlet traps hinged to said drum, means for introducing a flow of water into said drum, and means for revolving said cylinder.

2. A peeling machine comprising an inclosed drum having brushes mounted about its inner circumference, a revoluble cylinder mounted within said drum, brushes provided with pivot rods mounted on the periphery of said cylinder, and means for adjusting said rods to vary the planes of said last mentioned brushes.

3. A peeling machine comprising an inclosed drum having brushes mounted about its inner circumference, a revoluble cylinder mounted within said drum, brushes pivotally mounted on the periphery of said cylinder, and means whereby the planes of said pivoted brushes may be simultaneously and uniformly varied.

4. A peeling machine comprising an inclosed drum having brushes mounted about its inner circumference, a revoluble cylinder mounted within said drum, brushes pivotally mounted on the periphery of said cylinder, means for adjusting the plane of one of said pivoted brushes, and links connecting all of said pivoted brushes, whereby they are all simultaneously controlled by said adjusting means.

5. A peeling machine comprising an inclosed drum, spring pressed brushes mounted about the inner circumference of said drum, a revoluble cylinder mounted in said drum, brushes pivotally mounted on the periphery of said cylinder, and means for simultaneously and uniformly varying the planes of all of said pivoted brushes.

In testimony whereof, I have hereunto set my hand this 30th day of September, 1907.

HERMAN HAHN.

Witnesses:
M. P. RODRIGUES,
M. S. BETTENCOURT.